United States Patent [19]

Almeras

[11] Patent Number: 4,932,819
[45] Date of Patent: Jun. 12, 1990

[54] PIN FOR FIXING A PANEL

[75] Inventor: Roland Almeras, Tournon, France

[73] Assignee: Societe de Prospection et d'Inventions Techniques (S.P.I.T.), Bourg-Les-Valence, France

[21] Appl. No.: 149,775

[22] Filed: Jan. 29, 1988

[30] Foreign Application Priority Data

Jan. 30, 1987 [FR] France .................. 87 01122

[51] Int. Cl.⁵ .............................................. F16B 15/00
[52] U.S. Cl. ................................. 411/441; 411/532; 411/386; 52/410; 403/408.1
[58] Field of Search ............... 411/441, 440, 487, 490, 411/497, 922, 531–532, 29–31, 477–479, 546, 547, 386, 387, 424, 426; 403/408.1, 405.1; 52/410

[56] References Cited

U.S. PATENT DOCUMENTS

| 377,805 | 2/1888 | Grant | 411/490 |
|---|---|---|---|
| 1,637,419 | 8/1927 | Klein | 411/922 X |
| 3,491,933 | 1/1970 | Thurner et al. | 411/441 X |
| 3,494,018 | 2/1970 | Helderman et al. | 411/441 X |
| 3,870,428 | 3/1975 | Jackson | 411/441 X |
| 4,043,247 | 8/1977 | Rowinski | 411/479 |
| 4,239,143 | 12/1980 | Johnson | 227/70 |
| 4,287,656 | 9/1982 | Gassman et al. | 411/440 X |
| 4,354,782 | 10/1982 | Newport | 411/479 X |
| 4,453,361 | 6/1984 | Hulsey | 52/410 |
| 4,516,371 | 5/1985 | Simpson | 52/410 |
| 4,621,963 | 11/1986 | Reinwall | 411/386 X |
| 4,736,560 | 4/1988 | Murphy | 411/29 X |

FOREIGN PATENT DOCUMENTS

| 2423410 | 11/1974 | Fed. Rep. of Germany | 411/497 |
|---|---|---|---|
| 2433174 | 1/1976 | Fed. Rep. of Germany | 411/441 |
| 1566657 | 3/1969 | France | 411/441 |
| 645437 | 9/1984 | Switzerland | 52/410 |
| 1142433 | 2/1969 | United Kingdom | 411/441 |
| 2094695 | 9/1982 | United Kingdom | 411/29 |

OTHER PUBLICATIONS

Popular Science; vol. 169, #6; Dec. 1956; p. 156.

Primary Examiner—Gary L. Smith
Assistant Examiner—F. Saether
Attorney, Agent, or Firm—Schwartz & Weinrieb

[57] ABSTRACT

A pin for fixing a panel to a support material is provided, having a shank (1) and a head (4), and a narrowed anchorage portion (5), a washer (2) for pressing the panel to be fixed against the support material and a guide (3) for limiting the penetration depth the shank (1). The pin, to be anchored within a material supporting the panel by means of a powder actuated tool does not damage the panel and ensures fixing of the pin with very good quality The guide (3) comprises a cylindrical tube which forms a hole within the panel, within which the cylindrical tube guide (3) is disposed so as to serve as a guide for the shank (1) of the pin as the same is being driven therethrough and into the support material.

11 Claims, 2 Drawing Sheets

PIN FOR FIXING A PANEL

FIELD OF THE INVENTION

The present invention relates to a pin for fixing or nailing panels, having a head and a shank and intended to be propelled by means of a power-actuated tool(-PAT).

BACKGROUND OF THE INVENTION

The insulation of buildings, whether it pertains to interior insulation or exterior insulation, renovations or new constructions, raises more and more problems for businesses because of the fact that the insulating panels which are available to them have a greater and greater thickness and a smaller and smaller crushing strength. Thus it is with polystyrene, fibrastyrene, corkene panels, or the like.

With a conventional pin, formed of a shank having a head at one end thereof, driven through such a panel and into the supporting material using a power actuated tool, one runs the risk of crushing the panel. This is why wall plugs are in fact preferred to fixing pins. However, when using wall plugs, it was previously necessary to drill a reception hole within the support material using a drill of great length which is fragile and expensive. Furthermore, boring of such a wall plug reception hole takes time and further requires a power supply source.

OBJECT OF THE INVENTION

It is under these conditions and to overcome these drawbacks that the applicant proposes his invention.

SUMMARY OF THE INVENTION

The present invention relates to a pin, for fixing a panel to a support material, having a shank and a head, and intended to be propelled by means of a power actuated tool, characterized by the fact that it includes means for securing a panel upon the support material and means for limiting the penetration depth of the shank into the support material.

In the preferred embodiment of the pin of the present invention, the head, the application means and the means for limiting the penetration depth are adapted so as to cooperate together and ensure limitation of the depth of penetration of the shank of the pin.

Advantageously, the means for limiting the depth of penetration of the shank are formed as a guide for the shank and the application means is defined by means of a washer, interposed between the head and the guide, the latter playing the role of a spacer interposed between the washer and the support material so as to ensure that the pin is correctly driven in.

The shank of the pin may have a reduced diameter, as does also the guide which may be readily driven into the panel to be fixed. The guide prevents the shank from being in contact with the support material at the time of firing of the power actuated tool, which is favorable for the fixing quality of the pin assembly; the guide, serving as a barrel for the shank, further prevents the latter from bending at the time of driving the pin into the support material; the guide, which controls the depth to which the pin is driven into the support material, finally prevents the pin from damaging the panel and the fixing site.

BRIEF DESCRIPTION OF THE DRAWINGS

The invention will be better understood from the following description of several embodiments of the fixing pin of the invention, with reference to the accompanying Figures in which.

DETAILED DESCRIPTION OF THE ILLUSTRATED EMBODIMENTS

Figures 1, 2, 3:
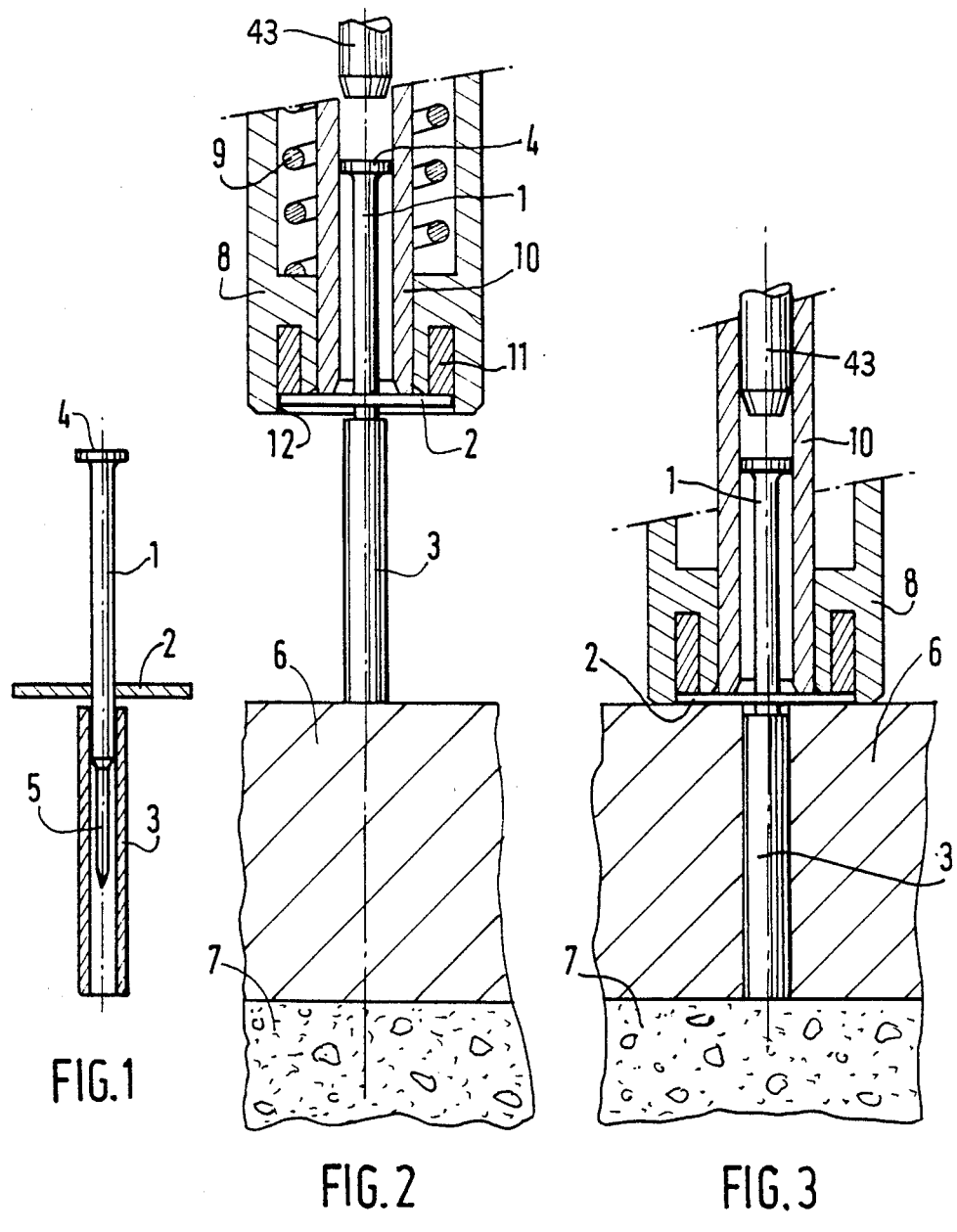
FIG. 1 is a view of a first embodiment of the pin of the invention.
FIG. 2 is a view of the fixing pin shown in FIG. 1, before it penetrates into an insulating panel to be fixed to a support material.
FIG. 3 is a view of the fixing pin of FIG. 1, before penetration into the support material.

The fixing pin of the invention, with reference to FIG. 1, includes a shank 1, a washer 2 and a rigid tubular guide 3. Shank 1, ending at one end in a head 4 having a diameter greater than that of the shank, has, at the other end, an anchorage part 5 of reduced diameter and tapered for introduction into the material supporting an insulating panel to be fixed thereto, anchorage parts. extending below the large diameter portion of the shank 1 of the pin so as to extend through and beneath the panel and into support material 7.

Washer 2, having an external diameter appreciably greater than that of shank 1, has an internal diameter slightly smaller than the external diameter of shank 1, so that it has been force fitted upon shank 1, over the largest diameter portion thereof. Washer 2 may nevertheless slide with a force fit upon shank 1 of the pin.

Guide 3, in the embodiment shown in FIG. 1, is a tube slit along an axial plane, having an internal diameter slightly smaller than the diameter of the enlarged diameter portion of shank 1, and mounted, with a force fit, upon this portion of shank 1, by means of the reduced diameter portion thereof.

The axial length of guide 3 is slightly smaller than the thickness of the panel to be fixed upon the support material, or in other words slightly smaller than the distance between the external surface of the panel and the support. The axial length of the enlarged diameter portion of shank 1, except for the thickness of washer 2, is substantially equal to that of guide 3 so that only the reduced diameter portion 5 of shank 1 is anchored within the support material 7.

Other embodiments of the guide and of the washer may be envisaged, without altering their functions which will be described further on.

Figure 5:
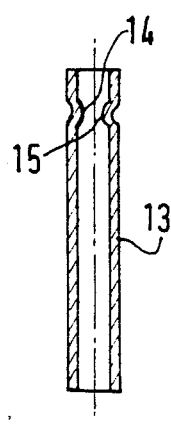
FIG. 5 is a view of a second embodiment of the guide for the fixing pin of the invention.

The guide of FIG. 5 is a tube 13, not split, but shaped so that two bosses 14, 15 project diametrically inwardly within the same axial plane, for temporarily holding the tube upon the shank. A single boss could be provided or, on the contrary, more than two.

Figure 6:
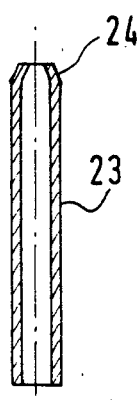
FIG. 6 is a view of a third embodiment of the guide for the fixing pin of the invention.

The guide shown in FIG. 6 is a cylindrical tube 23 deformed at one end 24 so as to have an oval-shaped or substantially elliptically-shaped opening, one of the diametrical dimensions of which is smaller than the diameter of the enlarged diameter portion of shank 1, so as to temporarily hold the tube 23 upon the shank 1.

Figure 7:
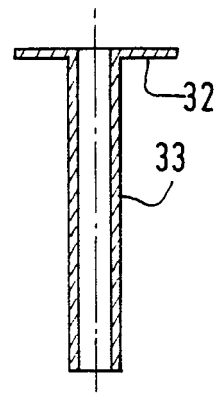
FIG. 7 is a view of a fourth embodiment of the guide for the fixing pin of the invention.

The guide shown in FIG. 7 is a tube 33, to which washer 32 is integrally secured so as to form a single piece assembly therewith. In this embodiment, the tube may have been formed like that shown in FIGS. 1 and 5.

A guide in the form of a shouldered tube could also be envisaged, with a rear portion having an internal diameter equal to the diameter of the pin and a front portion having a slightly reduced internal diameter forming a shoulder upon which the pin kits abuts before firing.

It will be noted, that, although it is preferable for the guide and the washer to remain attached to the shank of the pin during storage and handling, this is not an imperative condition of the invention. The guide and/or the washer of the pin of the invention could be freely mounted upon the shank of the pin.

The pin, in another embodiment, could have a shank of constant diameter, tapered in its front part.

The use of the pin of the invention will now be described, in an application for fixing a relatively soft insulating panel 6 having a predetermined thickness to a support material 7, for example a concrete support, the lengths of the shank and of the guide for the pin being appropriate for the thickness of the panel 6 as well as for the nature of the support material 7.

Anchorage of the pin and fixing of the panel are obtained using a powder actuated tool well known in the art. For this reason, only the parts of this apparatus required for understanding the description have been shown in FIGS. 2-4.

Thus, a guide 8 is mounted for slideable movement at the front of the apparatus against the biasing force of a spring 9 upon a barrel 10 of the apparatus. A plurality of magnets 11, are mounted at the front of guide 8, axially recessed with respect to a front circular central opening 12. A propulsion weight 43 is mounted within barrel 10 so as to be driven by means of the combustion gases of the powder charge and to, in turn, propel the pin 1.

The operator first fits the pin head into barrel 10 and guide 8 of the apparatus, which has been previously prepared for firing, the head 4 of shank 1 being inserted within the barrel 10 and washer 2 being disposed within the recess 12 of guide 8. The pin is thus held within the apparatus by means of the magnets 11, guidance therefore being provided by means of its head 4 and its washer 2 which are held, like guide 3, upon shank 1.

The operator, exerting pressure by means of the apparatus for driving washer 2 and the pin assembly therewith, drives guide 3 of the pin into panel 6, the small diametrical dimension of guide 3 facilitating such penetration, until guide 3 comes into abutment against the support material 7 (FIG. 3). It will be noted that at that time the shank 5 of the pin is still not in contact with the support material 7. The nature of the panel 6 could be such that guide 3 is only driven in until washer 2 comes into abutment against the panel so as to allow subsequent firing of the pin 1.

In the case where the washer is freely mounted upon the shank of the pin, the use of the pin of the invention would be the same, except that, during penetration of the guide into the insulating panel, the guide would be in abutment against the washer.

Figure 4:
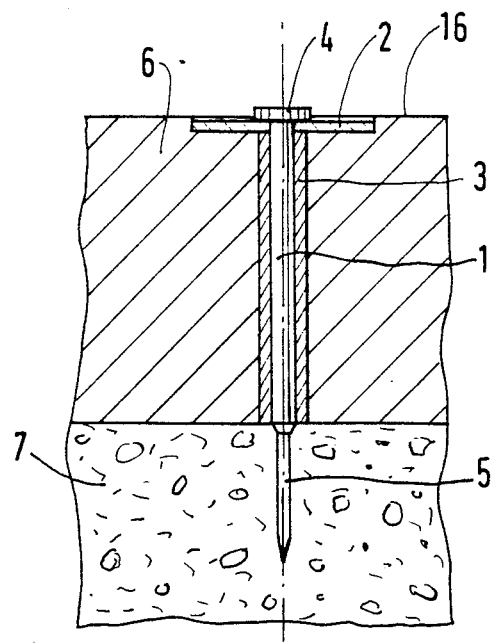
FIG. 4 is a view of the fixing pin of FIG. 1 after the insulating panel has been fixed.

The operator then fires the shot. Weight 43 drives shank 1 whose head 4 strikes washer 2. Washer 2 is in turn driven until it comes into abutment against guide 3 so as to be slightly recessed with respect to the external surface 16 of panel 6. At this time, reduced diameter anchorage port 5 of shank 1 has also been driven into the support material 7 (FIG. 4). During the driving operation of the pin, guide 3 has served as an auxiliary barrel for shank 1 thus preventing it from bending.

The guide 3, in cooperation with the washer 2 and the head of the shank, has allowed the depth of penetration of the pin to be controlled and limited. Panel 6, which has not been damaged, is well protected by means of washer 2. From the aesthetic point of view, only the head 4 of the pin appears upon the surface of the panel. The fixing operation thereby completed, under conditions of great simplicity, offers a good resistance to stripping of the pin assembly.

Obivously, many modifications and variations of the present invention are possible in light of the above teachings. It is therefore to be understood that within the scope of the appended claims, the present invention may be practiced otherwise than as specifically described herein.

I claim:

1. Apparatus for fixing a panel upon a support material, comprising a plurality of pin assemblies, wherein each pin assembly individually and separately comprises:

a pin, having a shank portion and a head portion, to be inserted through said panel and into said support material for fixing said panel upon said support material;

a washer disposed about said shank portion of said pin at a position beneath said head portion of said pin so as to be interposed between said head portion of said pin and said panel such that an upper surface portion of said washer is engaged with said head portion of said pin and an undersurface portion of said washer is engaged with said panel when said pin is inserted through said panel and into said support material in order to fix said panel upon said support material; and cylindrical guide tube means disposed about said shank portion of said pin, at a position beneath said washer, for forming a through-bore within said panel within which said cylindrical guide tube will be fixedly disposed for guiding said shank portion of said pin through said panel and into said support material when said pin is inserted through said panel and into said support material, and for engaging said support material at one end thereof and said undersurface portion of said washer at another end thereof so as to limit the penetration depth of said washer and said pin within said panel, as a result of said engagement between said cylindrical guide tube means and said support material, and between said cylindrical guide tube means and said washer, and between said washer and said head portion of said pin, in order to prevent damage to said panel as said pin is inserted through said panel and into said support material.

2. A pin assembly as set forth in claim 1, wherein: said cylindrical guide tube means comprises an axially split guide tube.

3. A pin assembly as set forth in claim 1, wherein: said cylindrical guide tube means has radially inwardly projecting boss means provided within an upper end portion of said cylindrical guide tube means for frictionally retaining said shank portion of said pin within said upper end portion of said cylindrical guide tube means prior to insertion of said pin through said panel and into said support material.

4. A pin assembly as set forth in claim 1, wherein:
said cylindrical guide tube means is radially deformed within an upper end portion of said cylindrical guide tube means for frictionally engaging said shank portion of said pin within said upper end portion of said cylindrical guide tube means prior to insertion of said pin through said panel and into said support material.

5. A pin assembly as set forth in claim 1, wherein:
said washer and said cylindrical guide tube means are integrally fixed together.

6. A pin assembly as set forth in claim 1, wherein:
said washer and said cylindrical guide tube means comprise a single-piece component.

7. A pin assembly as set forth in claim 1, wherein:
said shank portion of said pin has a lowermost end portion, which has a diametrical extent smaller than that of a remaining portion of said shank portion, for insertion within said support material.

8. A pin assembly as set forth in claim 7, wherein:
said remaining portion of said shank portion of said pin has an axial length which is substantially the same as the thickness of said panel.

9. A pin assembly as set forth in claim 7, wherein:
said remaining portion of said shank portion of said pin has an axial length which is substantially the same as the axial length of said cylindrical tube guide means.

10. A pin assembly as set forth in claim 1, wherein:
the axial length of said cylindrical tube guide means is substantially the same as the thickness of said panel.

11. A pin assembly as set forth in claim 1, wherein:
the axial length of said cylindrical tube guide means is slightly less than the thickness of said panel such that when said pin is inserted through said panel and into said support material, said washer is recessed within an outer surface portion of said panel.

* * * * *